(12) United States Patent
Kobayashi

(10) Patent No.: US 7,893,580 B2
(45) Date of Patent: Feb. 22, 2011

(54) POSITIONING MECHANISM OF RESOLVER AND ELECTRICALLY-DRIVEN POWER STEERING APPARATUS

(75) Inventor: Takayuki Kobayashi, Tochigi (JP)

(73) Assignee: Showa Corporation, Saitama (JP)

( * ) Notice: Subject to any disclaimer, the term of this patent is extended or adjusted under 35 U.S.C. 154(b) by 169 days.

(21) Appl. No.: 12/237,343

(22) Filed: Sep. 24, 2008

(65) Prior Publication Data

US 2009/0167121 A1 Jul. 2, 2009

(30) Foreign Application Priority Data

Dec. 27, 2007 (JP) .............................. 2007-338227

(51) Int. Cl.
*H02K 11/00* (2006.01)
(52) U.S. Cl. .................................................. 310/68 B
(58) Field of Classification Search ............... 310/68 B, 310/67 R, 89, 91; 304/207.25
See application file for complete search history.

(56) References Cited

U.S. PATENT DOCUMENTS

| 7,298,138 | B2 * | 11/2007 | Mimura | .................. 324/207.25 |
| 2008/0297010 | A1 * | 12/2008 | Yoshimura | .................. 310/68 B |

FOREIGN PATENT DOCUMENTS

| JP | 2003-97973 | * | 4/2003 |
| JP | 2007-1364 | * | 1/2007 |

* cited by examiner

*Primary Examiner*—Nguyen N Hanh
(74) *Attorney, Agent, or Firm*—Orum & Roth LLC

(57) ABSTRACT

In the power steering apparatus, of the present invention, bobbins and a bus ring holder are coupled and fixed to a stator so as to be positioned at constant circumferential positions with respect to the stator, and a resolver stator is held by a groove portion of a bus ring holder so as to be positioned at a constant circumferential position with respect to the stator. A resolver rotor is positioned at a constant circumferential position with respect to a rotor.

6 Claims, 15 Drawing Sheets

POSITIONING MECHANISM OF RESOLVER AND ELECTRICALLY-DRIVEN POWER STEERING APPARATUS

BACKGROUND OF THE INVENTION

1. Field of the Invention

The present invention relates to a positioning mechanism of a resolver of detecting rotational position of a rotor with respect to a stator and an electrically-driven power steering apparatus having the same.

2. Description of the Related Art

A brushless motor for an electrically-driven power steering apparatus includes a rotor having a permanent magnet and a stator having a plurality of coils. The rotor is rotated by alternately changing electric conduction of the coils. The brushless motor is used for a motor unit of the electrically-driven power steering apparatus of a vehicle. For example, a coaxial brushless motor is used for a rack type electrically-driven power steering apparatus, wherein a rack shaft is inserted into a rotation shaft of the rotor and the stator is disposed in a housing (referred to as a motor housing member) side of the motor unit fixed to a chassis. In addition, the brushless motor is provided with a resolver as a position detecting sensor for detecting rotational position of the rotor with respect to the stator so as to determine timing of changing the electrical conduction of the coils.

In a conventional electrically-driven power steering apparatus, the resolver is constructed with a resolver stator attached to a housing member (referred to as a connection housing member) side connected to the motor housing member and a resolver rotor attached to the rotor side. In the assembly processes for the electrically-driven power steering apparatus, where the motor housing member and the connection housing member are relatively rotatably temporarily-fixed to each other, the connection housing member is relatively rotated with respect to the motor housing member, so that position (phase) matching between the resolver stator and the resolver rotor in a relative rotational direction is performed. As a result, phase mismatching (mismatching of attachment position in the relative rotational direction) derived from the assembling of the resolver stator and the resolver rotor can be compensated (refer to Japanese Patent Application Laid-open (JP-A) No. 2007-1364 (Patent Document 1).

Due to a variation in accuracy of parts of each of the components, the electrically-driven power steering apparatus cannot control the angular phase of the resolver to be at a suitable position. For this reason, the motor housing member and the connection housing member are constructed as separate individual members, in a partitioned structure. After the resolver stator is attached to the connection housing member side, the connection housing member is relatively rotated with respect to the motor housing member.

However, if the motor housing member and the connection housing member are constructed as separate individual members, the number of parts is increased, and the number of assembling processes of assembling the two members is increased. As a result, production cost of the electrically-driven power steering apparatus is increased.

In such a structure that the resolver stator is attached to the connection housing member and, after that, the connection housing member is relatively rotated with respect to the motor housing member, there is a need for a separate process of relatively rotating the connection housing member with respect to the motor housing member. In addition, it is difficult to completely remove the phase mismatching derived from the assembling of the resolver stator and the resolver rotor.

SUMMARY OF THE INVENTION

The present invention is to provide a positioning mechanism for a resolver and an electrically-driven power steering apparatus which does not require phase matching between the a resolver stator and a resolver rotor, thereby reducing the number of parts and the number of assembling processes.

According to a first aspect of the present invention, there is provided a positioning mechanism of a resolver, which is disposed in, at, or around a housing member for receiving a brushless motor which has a rotor and a stator having a plurality of coils for rotating the rotor by alternately changing electrical conduction to the coils. Included are a resolver stator received in the housing member and a resolver rotor which is coupled and fixed at a constant circumferential position with respect to the rotor, arranged to rotate together with the rotor and detects a rotational position of the rotor with respect to the stator. A holding portion for holding the resolver stator is formed in the stator. A positioning member which positions the resolver stator with respect to the stator is coupled and fixed to the stator, to be positioned at a constant circumferential position with respect to the stator. The resolver stator is held by the holding portion so as to be positioned at a constant circumferential position with respect to the stator.

According to the first aspect of the present invention, the positioning member which positions the resolver stator with respect to the stator is coupled and fixed to the stator so as to be positioned at a constant circumferential position with respect to the stator. The resolver stator is held by the holding portion of the positioning member so as to be positioned at a constant circumferential position with respect to the stator. Therefore, the resolver stator can be positioned at a constant circumferential position with respect to the stator only by holding the resolver stator in the holding portion of the positioning member. Accordingly, angular phase mismatching of the resolver stator with respect to the stator can be prevented. In addition, since the resolver rotor is positioned at a constant circumferential position with respect to the rotor, angular phase mismatching of the resolver rotor with respect to the rotor can be prevented. As a result, angular phase matching between the resolver stator and the resolver rotor is not needed, and a rotational position of the rotor with respect to the stator can be accurately detected based on a change in magnetic reluctance generated between the resolver stator and the resolver rotor.

Particularly, since the brushless motor and the resolver stator are received in the same housing member, the number of parts and the number of assembling processes can be reduced in comparison with a conventional technique where the brushless motor and the resolver stator are received in separate housing members. As a result, production costs of the positioning mechanism of the resolver can be reduced. In addition, since the brushless motor and the resolver stator are received in a single housing member, the structure of the positioning mechanism of the resolver can be simplified.

According to a second aspect of the present invention, in the positioning mechanism according to the first aspect of the present invention, the positioning member may be constructed with bobbins which are positioned at constant circumferential positions with respect to the stator and a bus ring holder which is positioned at a constant circumferential position with respect to the bobbins, and the holding portion may be formed in the bus ring holder.

According to the second aspect of the present invention, the positioning member is constructed with the bobbins which are attached to the stator so as to be positioned at constant circumferential positions with respect to the stator and the bus ring holder which is positioned at a constant circumferential position with respect to the bobbins. The resolver stator is held by the holding portion formed in the bus ring holder so as to be positioned. In this manner, the bobbins and the bus ring holder which are existent components of a conventional brushless motor are used as the positioning members, so that an increase in the number of parts can be prevented in comparison with a construction where the positioning members are constructed as separate members.

According to a third aspect of the present invention, in the positioning mechanism according to the second aspect of the present invention, the holding portion is a groove portion formed in the bus ring holder. A supporting member which is engaged with the groove portion is coupled and fixed to the resolver stator. The resolver stator is positioned at a constant circumferential position with respect to the stator by engaging the supporting member with the groove portion.

According to a third aspect of the present invention, the resolver stator can be positioned at a constant circumferential position with respect to the stator only by engaging the supporting member with the groove portion of the bus ring holder. In this manner, the positioning of the resolver stator at the constant circumferential position with respect to the stator can be accomplished simply by engaging the supporting member with the groove portion of the bus ring holder. As a result, the resolver stator can be easily positioned.

According to a fourth aspect of the present invention, there is provided an electrically-driven power steering apparatus having the positioning mechanism according to any one of the first to third aspects of the present invention.

According to the fourth aspect of the present invention, the positioning member which positions the resolver stator with respect to the stator is coupled and fixed to the stator so as to be positioned at a constant circumferential position with respect to the stator. The resolver stator is held by the holding portion of the positioning member so as to be positioned at a constant circumferential position with respect to the stator. Therefore, the resolver stator can be positioned at the constant circumferential position with respect to the stator only by holding the resolver stator in the holding portion of the positioning member. Accordingly, phase mismatching of the resolver stator with respect to the stator can be prevented. In addition, since the resolver rotor is positioned at a constant circumferential position with respect to the rotor, phase mismatching of the resolver rotor with respect to the rotor can be prevented. As a result, phase matching between the resolver stator and the resolver rotor is not needed, and rotational position of the rotor with respect to the stator can be accurately detected based on a change in magnetic reluctance generated between the resolver stator and the resolver rotor.

Particularly, since the brushless motor and the resolver stator are received in the same housing member, the number of parts and the number of assembling processes can be reduced in comparison with a conventional technique where the brushless motor and the resolver stator are received in separate housing members. As a result, production cost of the electrically-driven power steering apparatus can be reduced. In addition, since the brushless motor and the resolver stator are received in a single housing member, the structure of the electrically-driven power steering apparatus can be simplified.

According to the present invention, phase matching between the resolver stator and the resolver rotor is not needed. In addition, it is possible to reduce the number of parts and the number of assembling steps. In addition, it is possible to reduce production costs.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

Hereinafter, a positioning mechanism of a resolver and an electrically-driven power steering apparatus having the positioning mechanism of a resolver according to a first embodiment of the present invention will be described with reference to the drawings.

Figure 1:
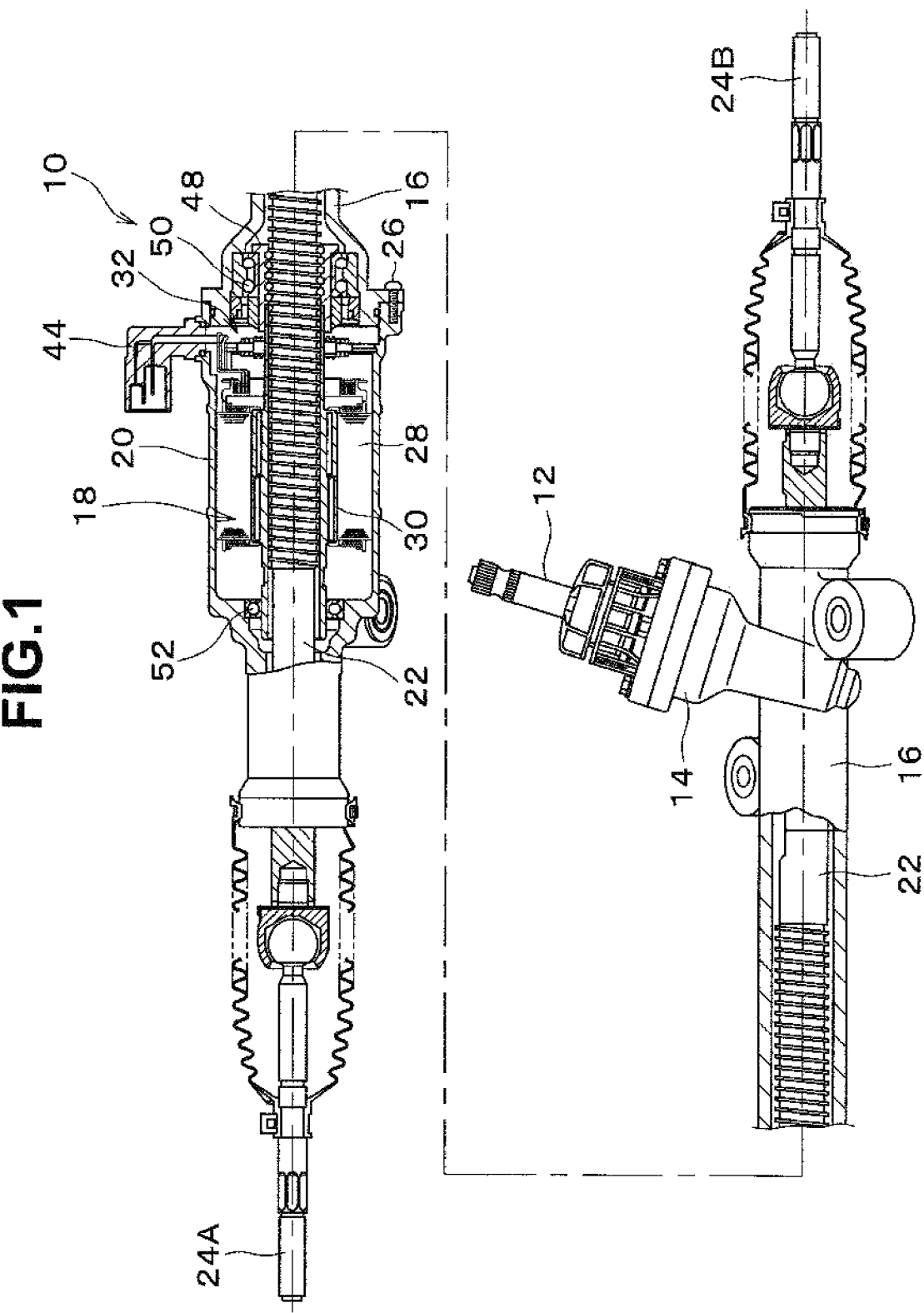
FIG. 1 is an overall view showing an electrically-driven power steering apparatus according to a first embodiment of the present invention.
Figure 2:
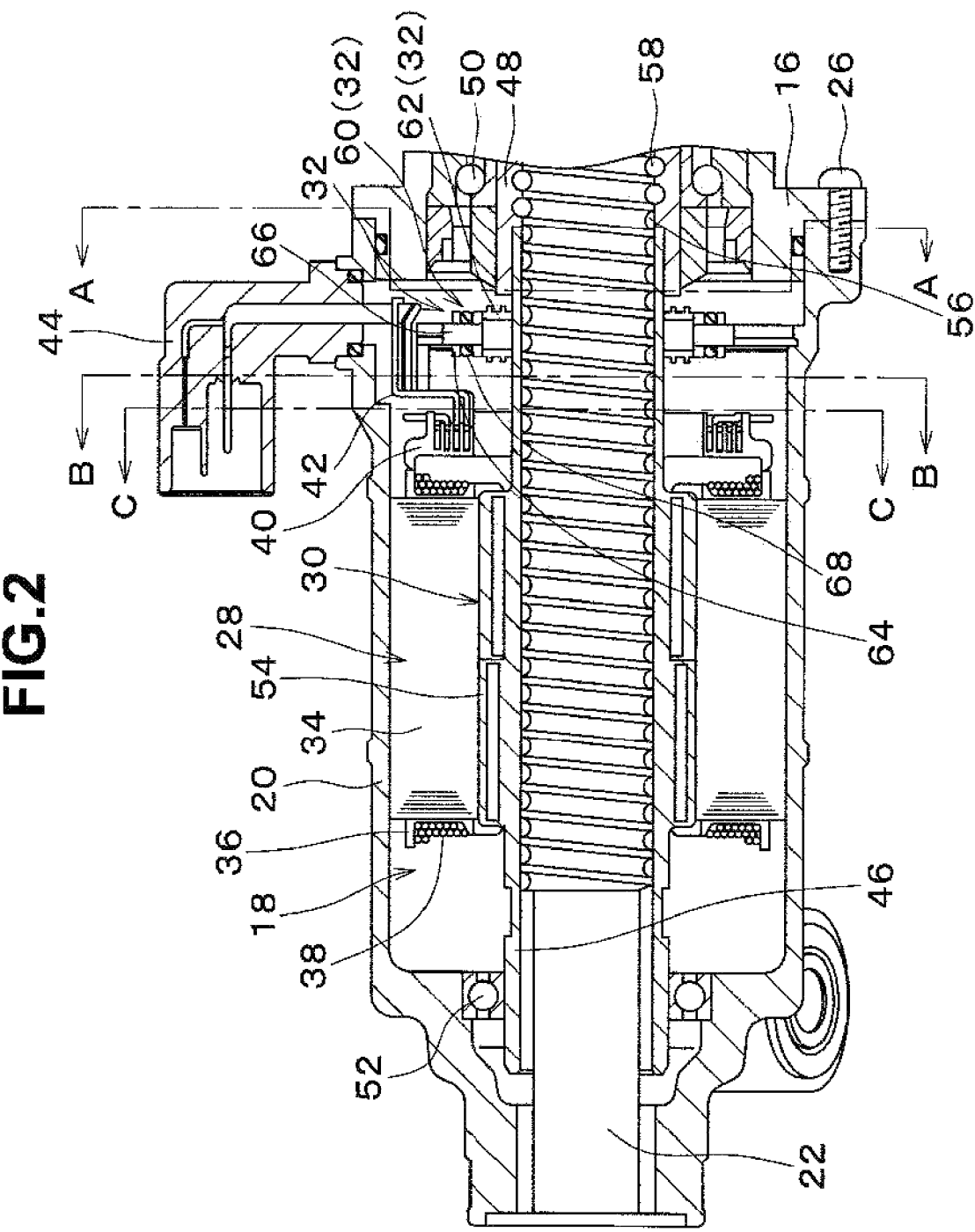
FIG. 2 is a cross-sectional view showing a brushless motor adapted to the electrically-driven power steering apparatus according to the first embodiment of the present invention.
Figure 3:
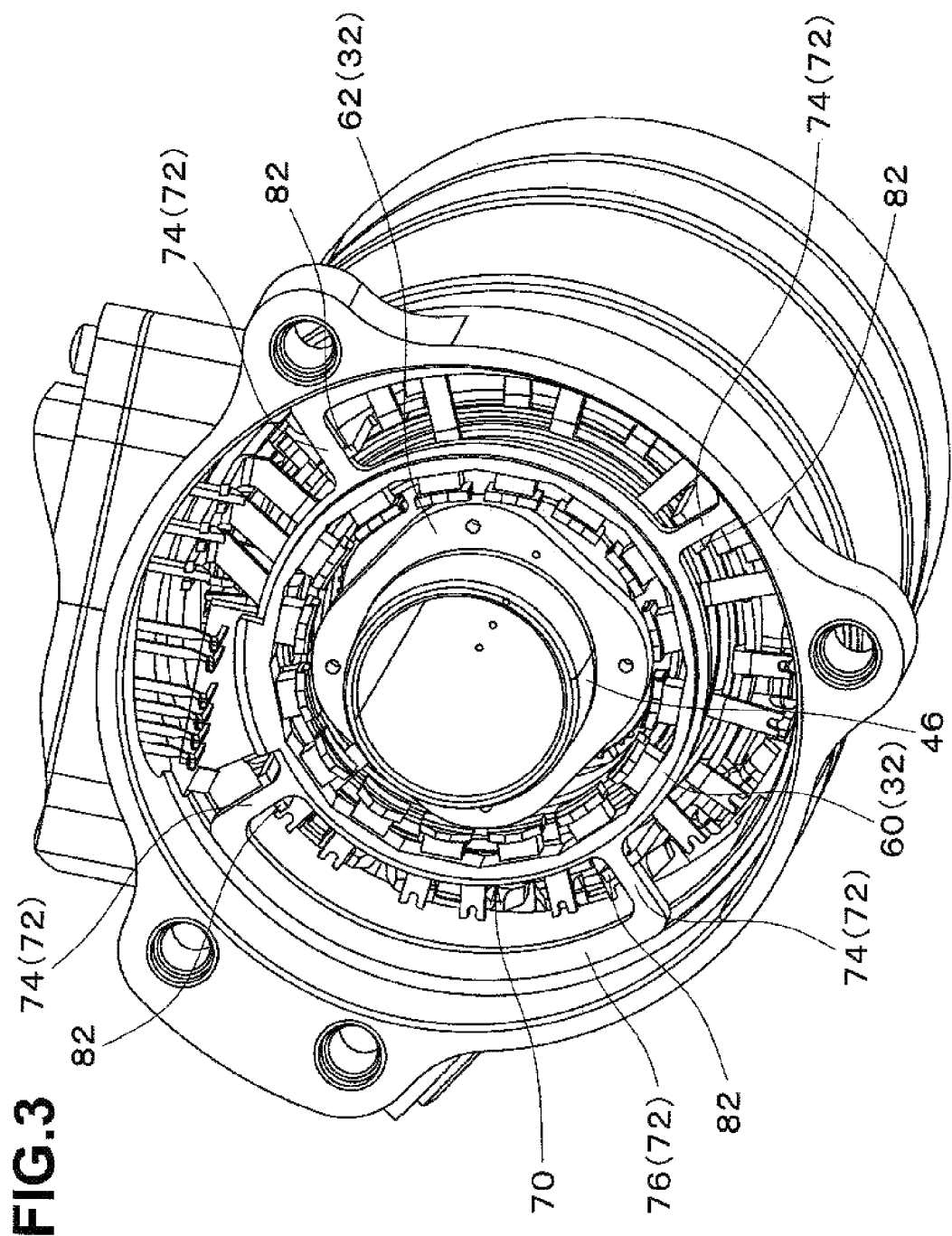
FIG. 3 is a perspective view showing an internal structure of the brushless motor adapted to the electrically-driven power steering apparatus according to the first embodiment of the present invention.
Figure 4:
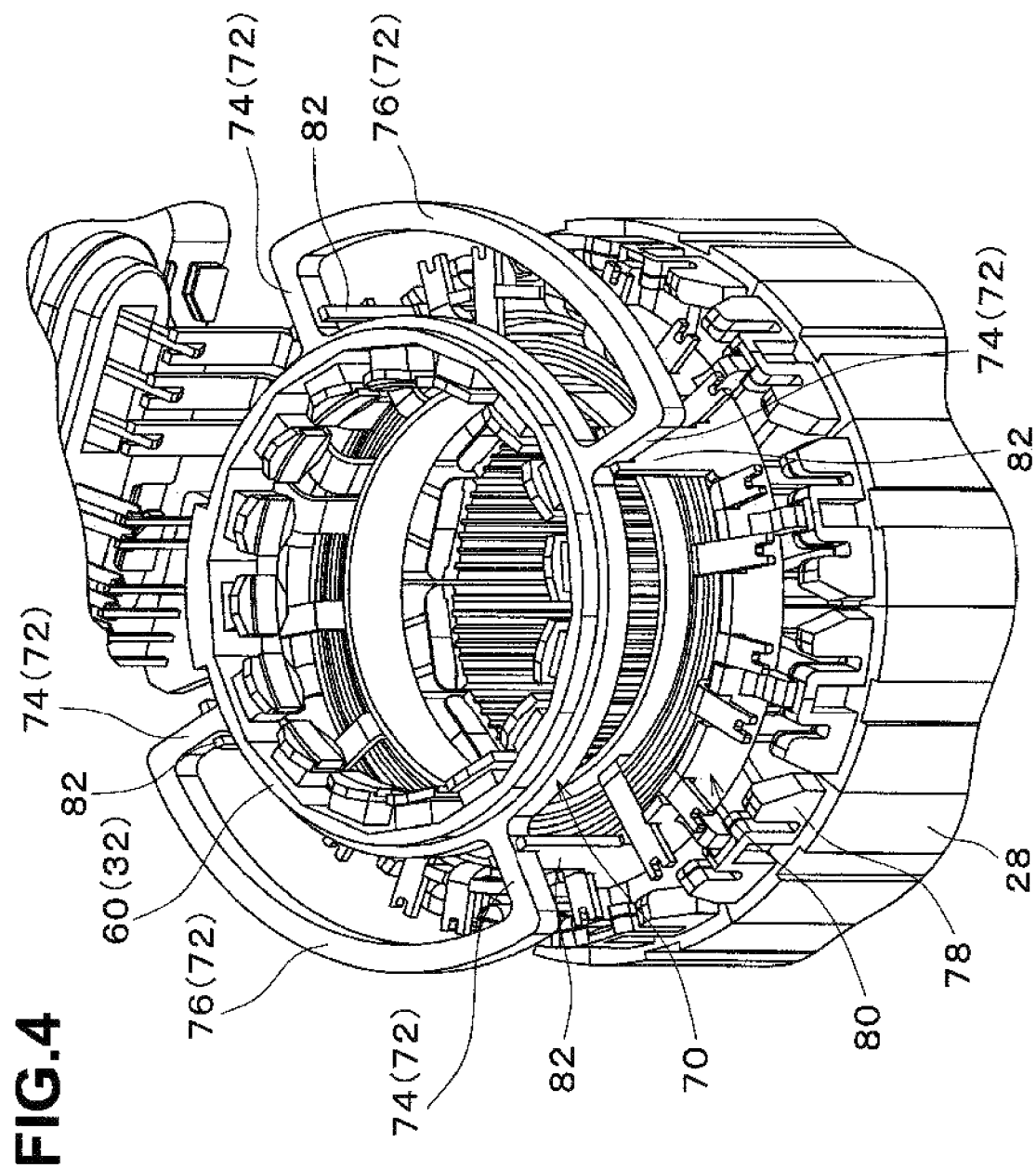
FIG. 4 is a perspective expanded view showing main components of the brushless motor adapted to the electrically-driven power steering apparatus according to the first embodiment of the present invention.
Figure 5:
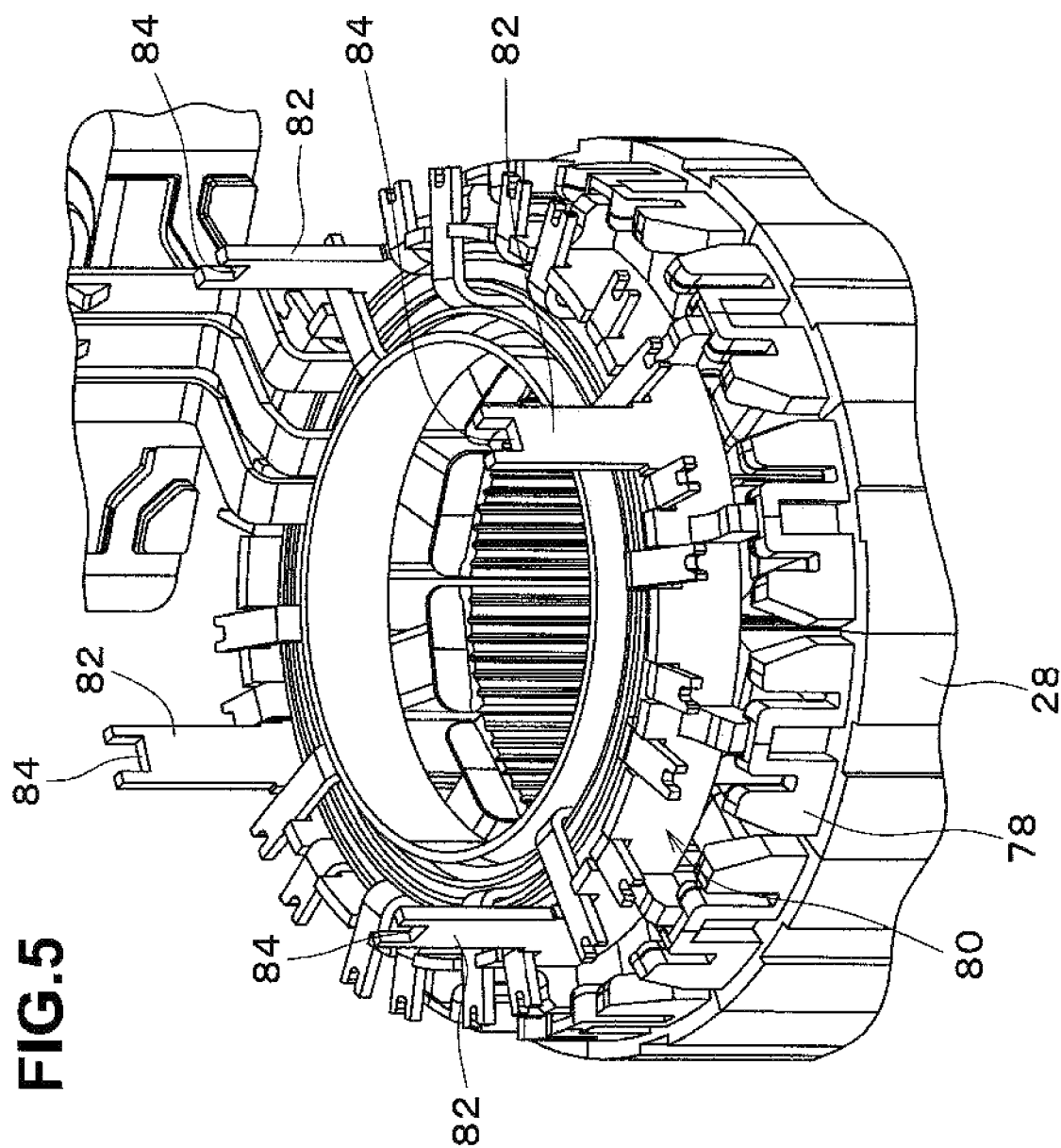
FIG. 5 is a perspective view showing a connection structure of a stator, bobbins, and a bus ring holder in the brushless motor adapted to the electrically-driven power steering apparatus according to a first embodiment of the present invention.
Figure 6:
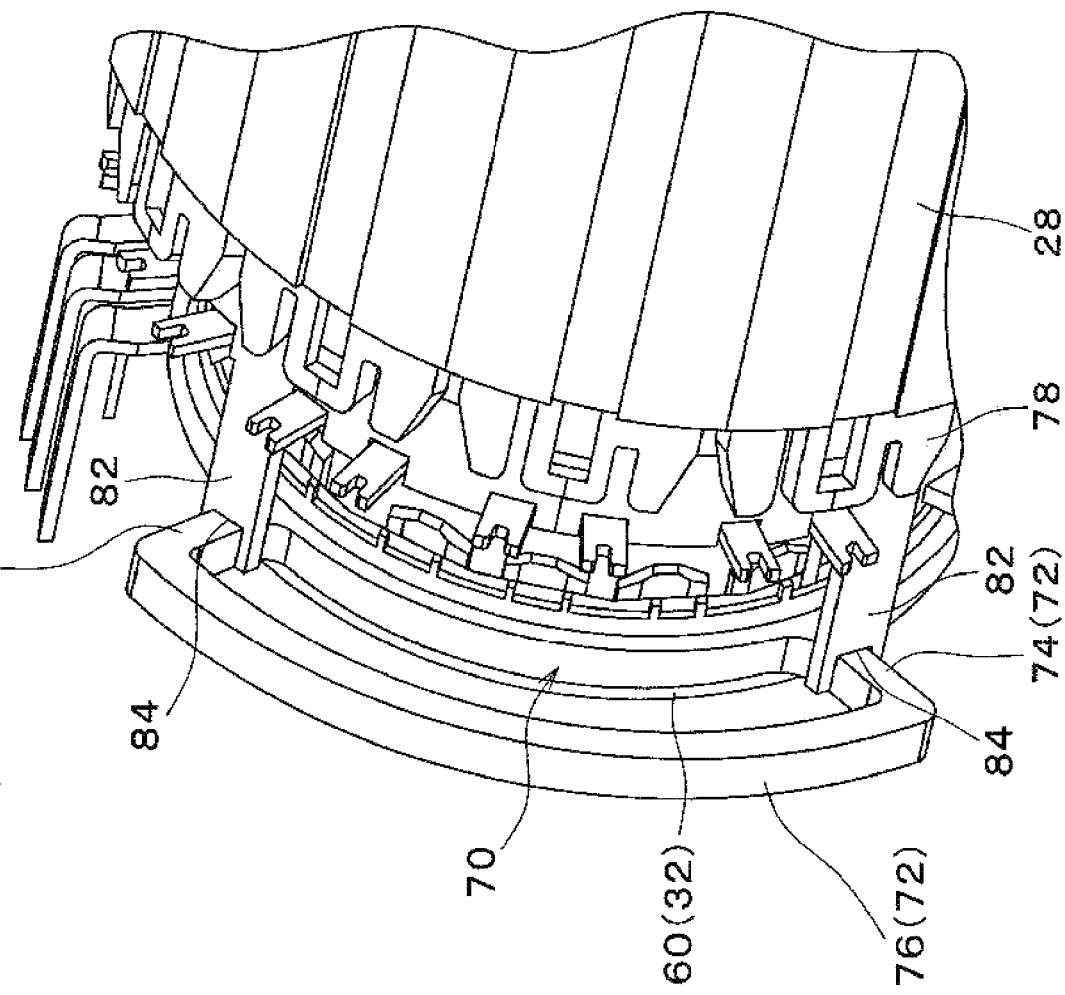
FIG. 6 is a perspective view showing a resolver stator held by the bus ring holder in the brushless motor adapted to the electrically-driven power steering apparatus according to the first embodiment of the present invention.
Figure 7:
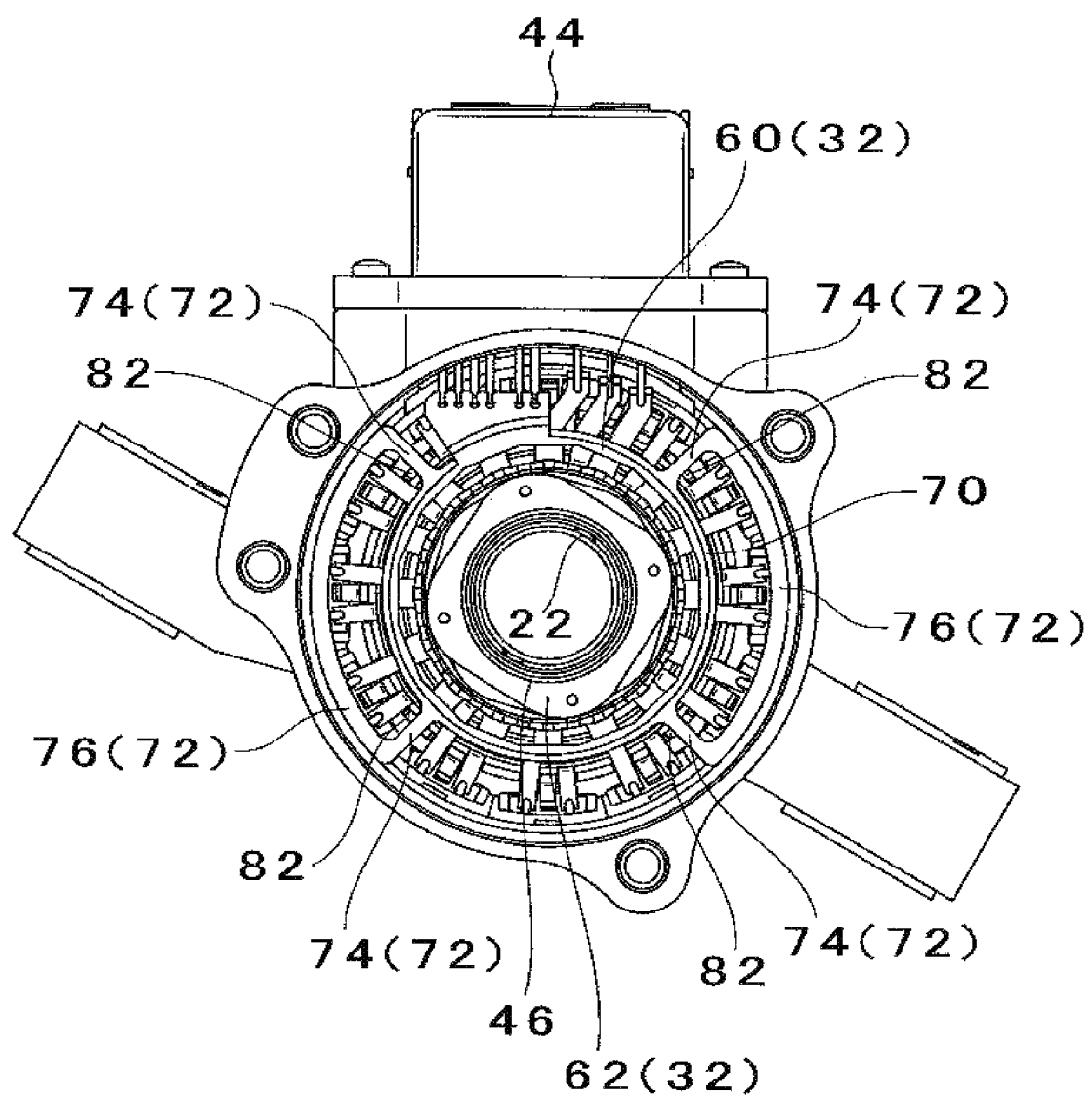
FIG. 7 is a constructional view as seen from line A-A of FIG. 2.
Figure 8:
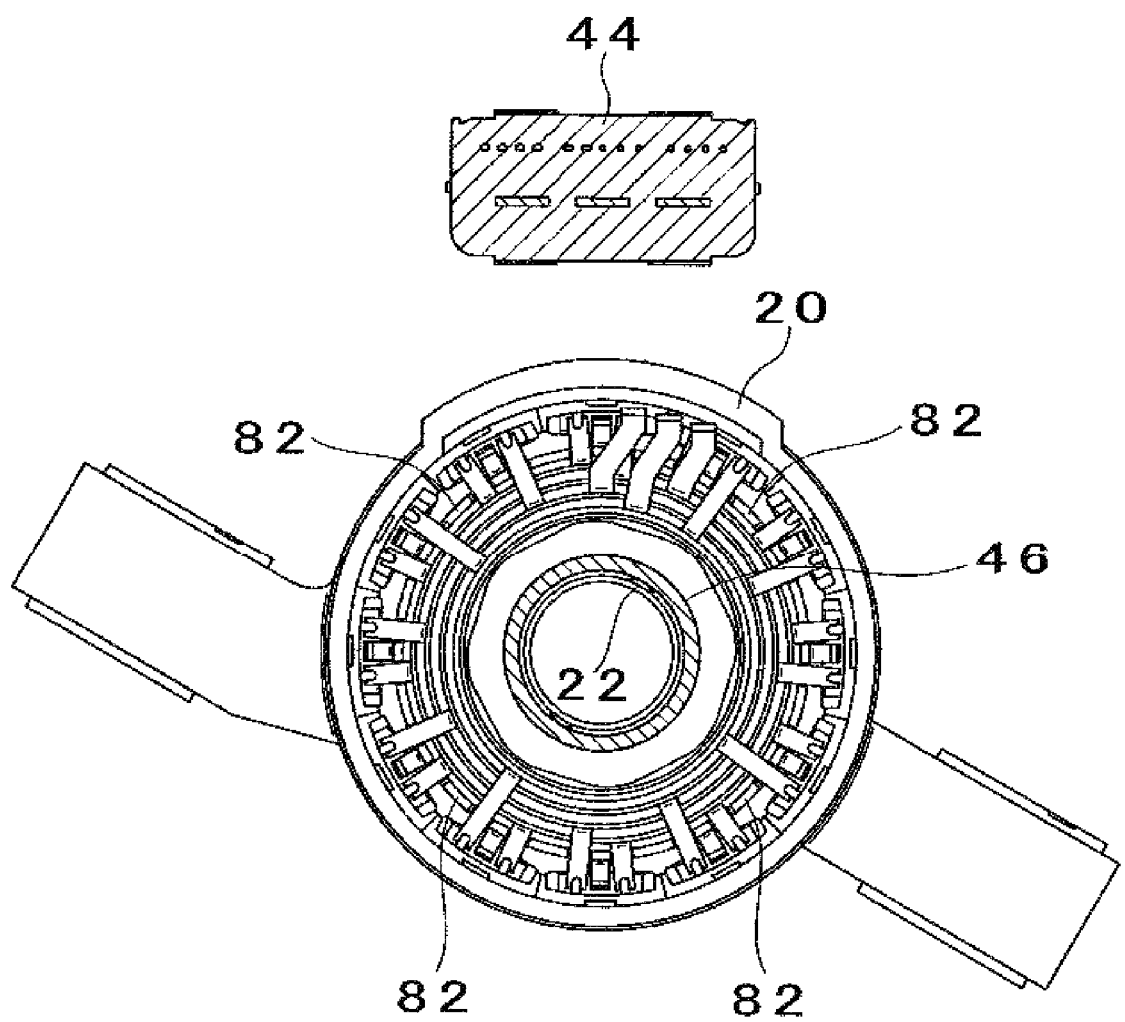
FIG. 8 is a cross-sectional view taken along line B-B of FIG. 2.
Figure 9:
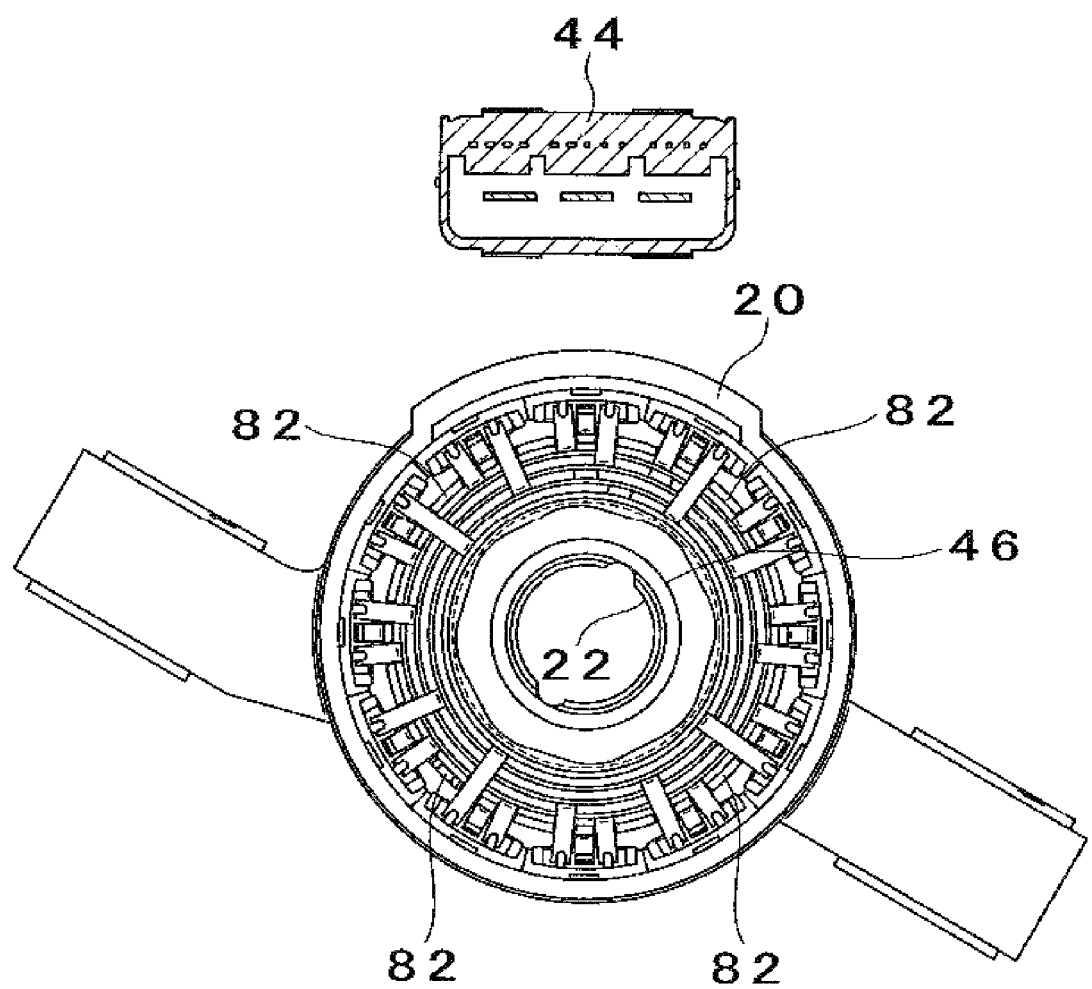
FIG. 9 is a cross-sectional view taken along line C-C of FIG. 2.

As shown in FIGS. 1 and 2, the electrically-driven power steering apparatus 10 includes a gear box 14 which supports an input shaft 12 coupled with a steering wheel (not shown). The gear box 14 is attached to a first housing member 16. A second housing member (housing member) 20 receiving a brushless motor 18 is attached to the first housing member 16. In the gear box 14, an output shaft (not shown) is connected through a torsion bar to the input shaft 12, and a steering torque detecting unit (not shown) is coupled between the input shaft 12 and the output shaft. A rack shaft 22 is inserted into the first housing member 16 and the second housing member 20 to support the housing members. The rack teeth of the rack shaft 22 are engaged with pinion teeth of the output shaft in the gear box 14, so that a rack-and-pinion mechanism is constructed. With such a construction, the rack shaft 22 is linearly moved in the axial direction according to manipulation of the steering wheel. In addition, tie rods 24A and 24B are connected to respective ends of the rack shaft 22, so that left and right wheels can be steered through the tie rods 24A and 24B according to the linear movement of the rack shaft 22.

In the electrically-driven power steering apparatus 10, the first housing member 16 is attached to the second housing member 20 with a bolt 26. The brushless motor 18 is disposed in the second housing member 20. The first housing member 16 and the second housing member 20 are separate individual housing members. The brushless motor 18 includes a stator 28, a rotor 30 which is rotatably disposed inside an inner circumferential surface of the stator 28, and a resolver 32 which detects a rotational position of the rotor 30 with respect to the stator 28.

The stator 28 includes a laminated iron core 34 which is pressed and fixed on an inner circumference of the second housing member 20, and coils 38 which are wound around the laminated iron core 34 with a resin insulator 36 (integrally formed with bobbins 78) interposed. Winding lines of the coils 38 are applied with current through a terminal 40 fixed to the second housing member 20. A cable (conductor) 42 for supplying current to the terminal 40 is extracted through a coupler 44 to an outside of the second housing member 20.

The rotor 30 includes a hollow rotation shaft 46 which is disposed around the rack shaft 22 over the entire length of the second housing member 20. The later-described ball nut 48 is fixed to the one end of the hollow rotation shaft 46. The ball nut 48 is pressed and supported by a bearing 50 of the first housing member 16. The other end of the hollow rotation shaft 46 is pressed and supported by a bearing 52 of the second housing member 20. A rotor magnet 54 is positioned and fixed in a circumferential direction to a region facing the stator 28 on an outer circumference of the hollow rotation shaft 46.

A ball screw 56 is provided to the rack shaft 22, so that the ball nut 48 engaged with the ball screw 56 is fixed to the one end of the hollow rotation shaft 46. Steel balls 58 are held between screw grooves of the ball screw 56 and screw grooves of the ball nut 48, so that rotation of the ball nut 48 is converted to straight movement of the rack shaft 22 by the ball screw 56.

The resolver 32 includes a resolver stator 60 which is coupled so as to be positioned at a constant circumferential position with respect to the stator 28, and a resolver rotor 62 which is coupled so as to be positioned at a constant circumferential position with respect to the rotor 30. The resolver stator 60 and the resolver rotor 62 are received in the second housing member 20 in the same manner as the brushless motor 18. In other words, the brushless motor 18 and the resolver stator 60 (and the resolver rotor 62) are received in a single housing member.

The resolver rotor 62 is constructed with a ring-shaped core where a plurality of the protrusions are disposed in the circumferential direction. The resolver stator 60 includes a coil 68 which is formed with winding lines wound around the laminated iron core 66 held by a ring-shaped resin bracket 64. The resolver stator 60 is disposed to surround the resolver rotor 62 which is rotated together with the hollow rotation shaft 46 of the rotor 30. Based on a change in magnetic reluctance generated between the resolver rotor 62 and resolver stator due to the rotation, a rotational position of the hollow rotation shaft 46 is detected. In response to the detected rotational position of the hollow rotation shaft 46, a predetermined current is supplied to each of U-phase, V-phase, and W-phase coils 38 of the stator 28, and brushless motor 18 is driven and controlled by an external controller.

Figure 10:
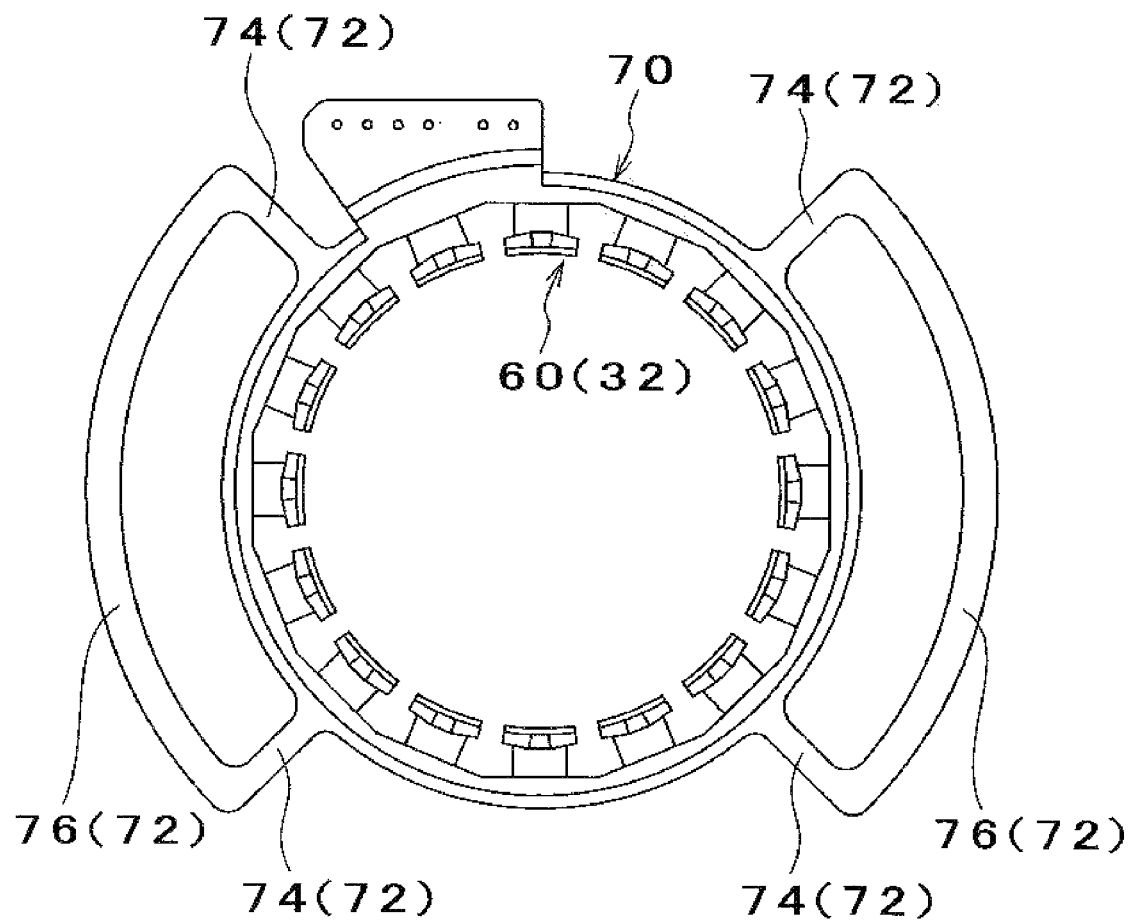
FIG. 10 is a front view showing a resolver stator and a supporting frame of the brushless motor adapted to the electrically-driven power steering apparatus according to the first embodiment of the present invention.
Figure 11:
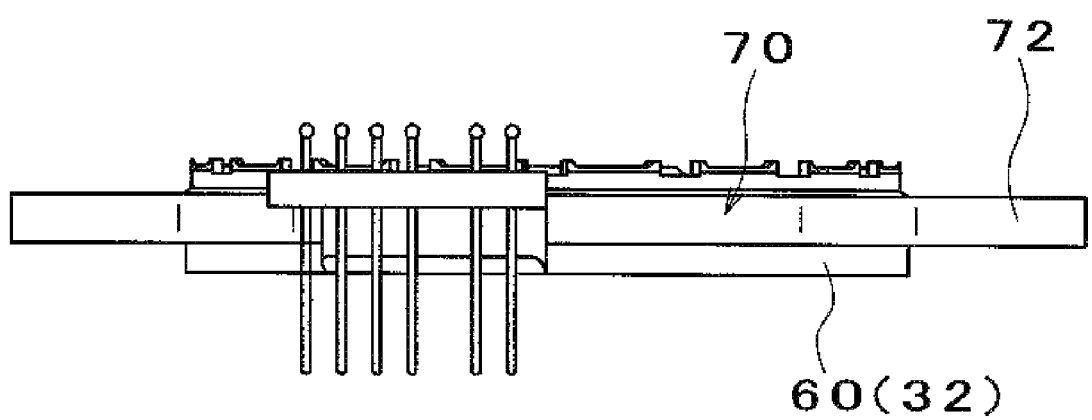
FIG. 11 is a plan view showing the resolver stator and the supporting frame of the brushless motor adapted to the electrically-driven power steering apparatus according to the first embodiment of the present invention.
Figure 12:
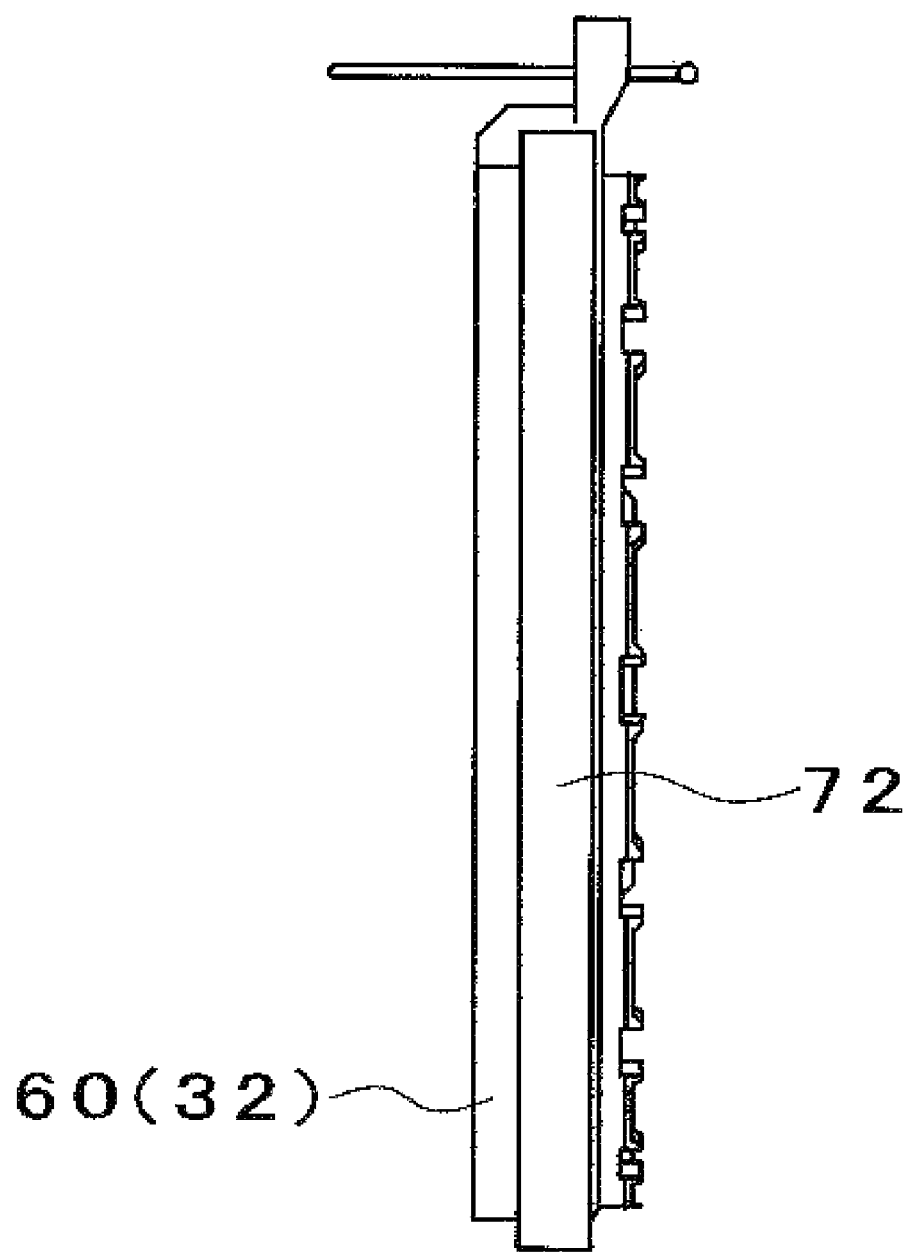
FIG. 12 is a side view showing the resolver stator and the supporting frame of the brushless motor adapted to the electrically-driven power steering apparatus according to the first embodiment of the present invention.

As shown in FIGS. 10 to 12, a supporting frame (supporting member) 70 having two arc-shaped frame portions 72 is attached on an outer circumferential side of the resolver stator 60. Each of the arch-shaped frame portions 72 is constructed with two straight portions 74 which extend in the radial direction and an arc-shaped portion 76 which connects one-side ends of the straight portions 74.

A positioning structure of the resolver stator 60 will be described in detail below.

As shown in FIGS. 3 to 9, bobbins (positioning members) 78 are coupled to the stator 28 so as to be positioned at constant circumferential positions with respect to the stator 28. Therefore, phase mismatching of the bobbins 78 with respect to the stator 28 cannot occur. The bobbins 78 are consecutively disposed along the circumferential direction of the stator 28. The bobbins 78 are engaged and coupled to protrusions formed on the bus ring holder (positioning member) 80 so as to be positioned at constant circumferential positions with respect to the stator 28. Therefore, phase mismatching of the bus ring holder 80 with respect to the bobbins 78 cannot occur. Since there is no phase mismatching between the bobbins 78 and the stator 28 and between the bus ring holder 80 and the bobbins 78, the bus ring holder 80 can be positioned at the constant circumferential position with respect to the stator 28, so that phase mismatching between the bus ring holder 80 and the stator 28 cannot occur.

Figure 13:
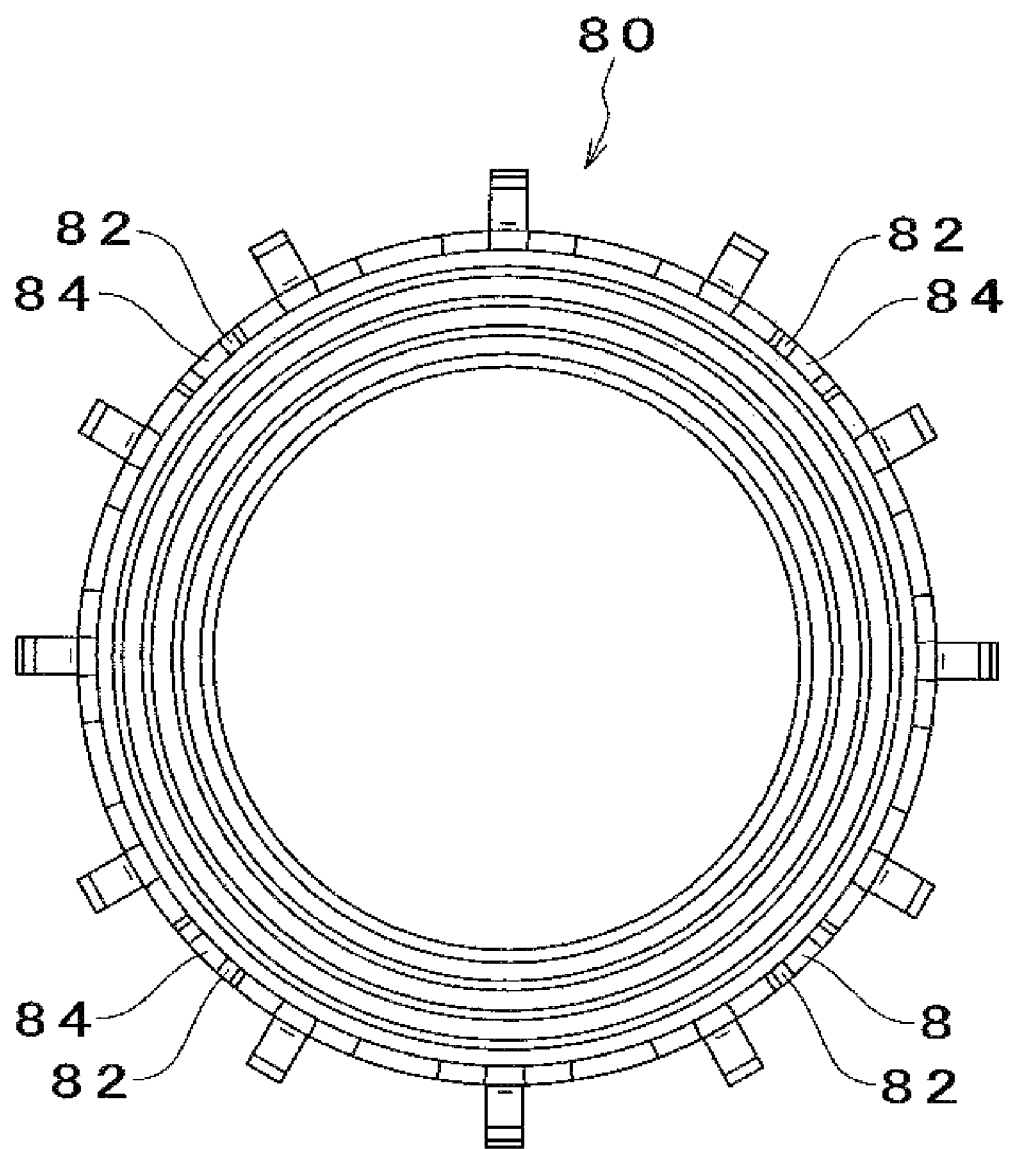
FIG. 13 is a front view showing the bus ring holder of the brushless motor adapted to the electrically-driven power steering apparatus according to the first embodiment of the present invention.
Figure 14:
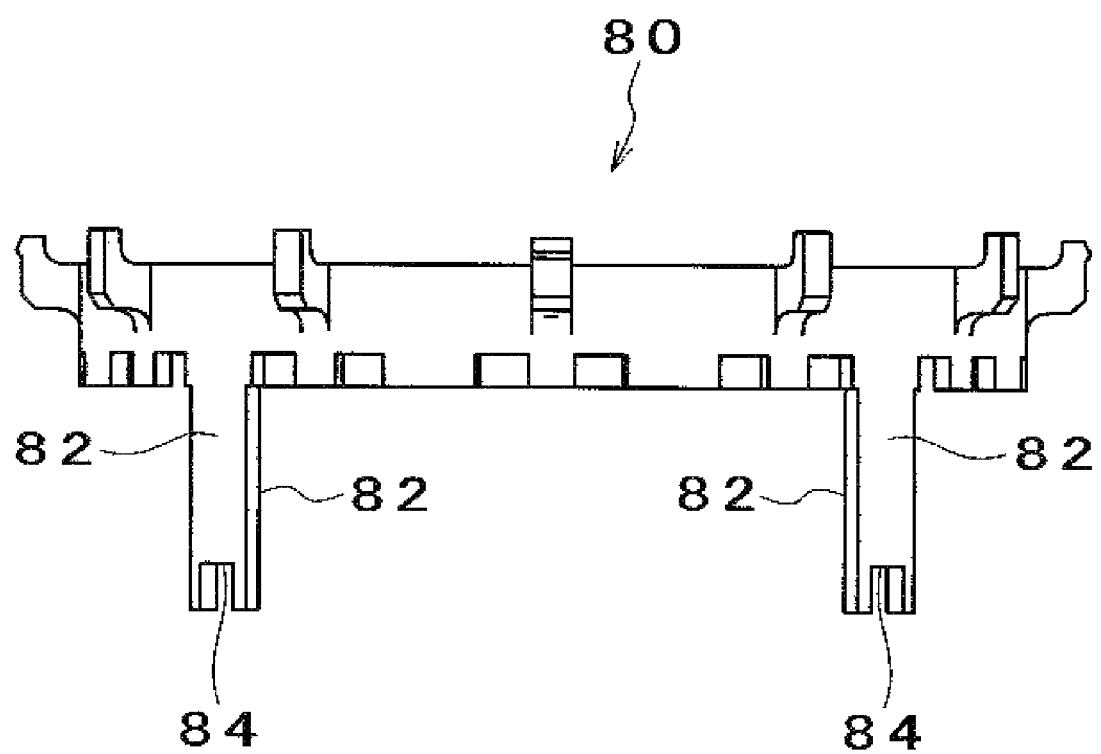
FIG. 14 is a plan view showing the bus ring holder of the brushless motor adapted to the electrically-driven power steering apparatus according to the first embodiment of the present invention.
Figure 15:
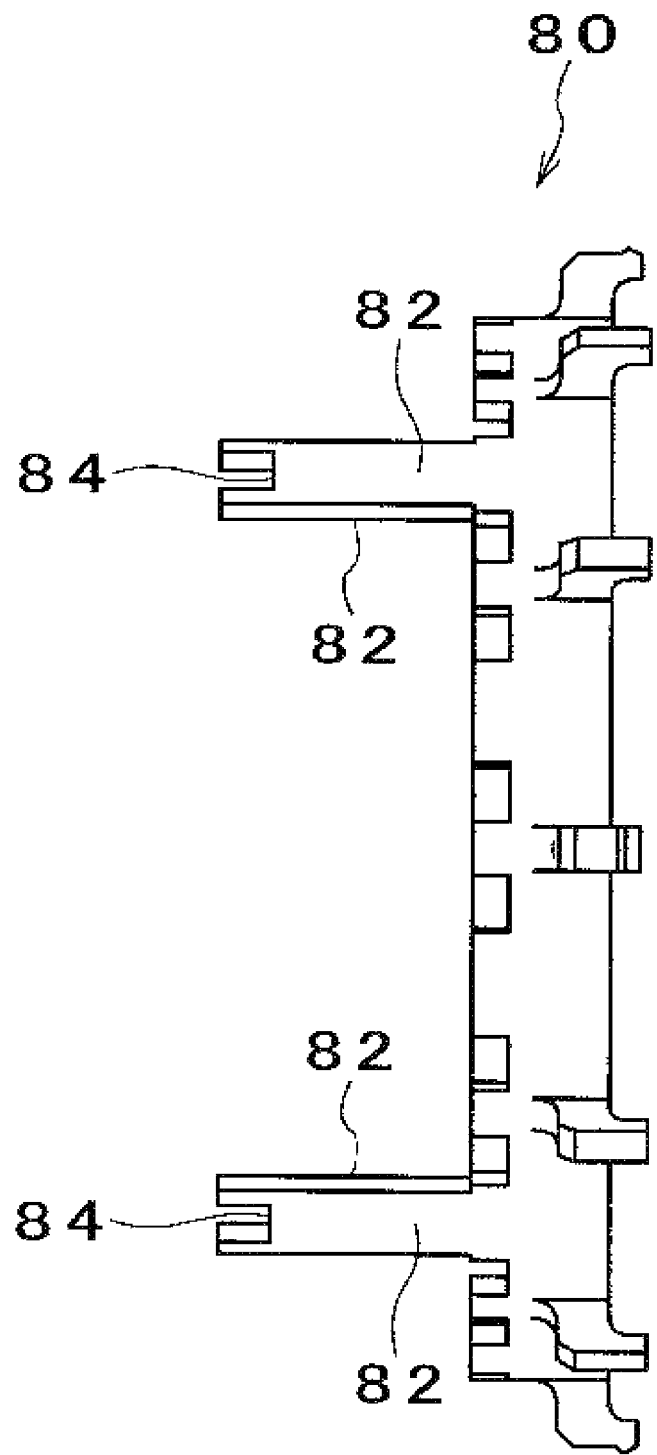
FIG. 15 is a side view showing the bus ring holder of the brushless motor adapted to the electrically-driven power steering apparatus according to the first embodiment of the present invention.

As shown in FIGS. 13 to 15, the bus ring holder 80 has four arm portions (holder portions) 82 which extend in the axial direction. A groove portion 84 into which the straight portion 74 of the arch-shaped frame portion 72 of the supporting frame 70 is inserted is formed at a distal end of each arm portion 82. The resolver stator 60 is fixed to the stator 28 by engaging the straight portions 74 with the groove portions 84 formed in the arm portions 82 of the bus ring holder 80.

Each arm portion 82 is positioned at the constant circumferential position with respect to the stator 28. The resolver stator 60 can be positioned at the constant circumferential position with respect to the stator 28 by engaging the straight portion 74 with the groove portion 84 of each positioned arm portion 82. Since the resolver stator 60 is connected to the stator 28 through the bobbins 78 and the bus ring holder 80 which are positioned with respect to the stator 28, the resolver stator 60 can be positioned at the constant circumferential position with respect to the stator 28. Therefore, phase mismatching between the resolver stator 60 and the stator 28 cannot occur. In this manner, since the assembling accuracy of the bobbins 78 and the bus ring holder 80 with respect to the stator 28 is high, the positioning of the resolver stator 60 with respect to the stator 28 can be accomplished only by engaging each straight portion 74 of the supporting frame 70 with the groove portion 84 of each arm portion 82 of the bus ring holder 80.

In such an electrically-driven power steering apparatus 10, if a steering torque detected by the steering torque detecting unit is smaller than a predetermined value, steering assist force is not needed, so that the brushless motor 18 is not driven.

Alternately, if the steering torque detected by the steering torque detecting unit is larger than a predetermined value, steering assist force is needed, so that the brushless motor 18 is driven. In the brushless motor 18, the coil 38 of the stator 28 is applied with current so as to generate the necessary steering assistant force, and the rotor 30 is driven to rotate by a magnetic field generated in the stator 28. The generated torque of the brushless motor 18 is transmitted from the rotor 30 through the hollow rotation shaft 46 to the ball nut 48. The rotation of the ball nut 48 is converted straight movement of the rack shaft 22 along the axial direction thereof by the ball screws 56. Accordingly, steering assist force is applied to the wheels cooperatively connected to the rack shaft 22.

Operations of the positioning mechanism of the resolver according to the first embodiment and the electrically-driven power steering apparatus having the positioning mechanism of the resolver will be described below.

As shown in FIGS. 3 to 9, since the bobbins 78 and the bus ring holder 80 are positioned at the constant circumferential positions with respect to the stator 28, the groove portions 84 formed in the arm portions 82 of the bus ring holder 80 are positioned at the constant circumferential positions with respect to the stator 28.

The straight portions 74 of the arc-shaped frame portions 72 of the supporting frame 70 attached to the resolver stator 60 are fitted (engaged) to the groove portions 84 formed in the arm portions 82 of the bus ring holder 80. Accordingly, the resolver stator 60 can be coupled to the stator 28. As described above, since the bobbins 78 and the bus ring holder 80 are positioned at the constant circumferential positions with respect to the stator 28, the resolver stator 60 is positioned at a constant circumferential position with respect to the stator 28 while coupling the resolver stator 60 with the bus ring holder 80. In this manner, when the resolver stator 60 is coupled to the bus ring holder 80, the positioning of the resolver stator 60 with respect to the stator 28 is accomplished. Therefore, phase mismatching between the resolver stator 60 and the stator 28 cannot occur.

In addition, since the resolver rotor 62 is positioned at a constant circumferential position with respect to the rotor 30, phase mismatching between the resolver rotor 62 and the rotor 30 cannot occur. As a result, phase matching between the resolver stator 60 and resolver rotor 62 is not needed, and the rotational position of the rotor 30 with respect to the stator 28 can be accurately detected based on a change in magnetic reluctance generated between the resolver stator 60 and the resolver rotor 62.

Since the brushless motor 18 and the resolver stator 60 are received in the same housing member, that is, the second housing member 20, the number of parts and the number of assembling steps can be reduced in comparison with a conventional technique where the brushless motor and the resolver stator are received in separate housing members. As a result, the production costs of the positioning mechanism of the resolver 32 and the electrically-driven power steering apparatus 10 can be reduced. In addition, since the brushless motor 18 and the resolver stator 60 are received in the single housing member 20, that is, the second housing member 20, the structures of the positioning mechanism of the resolver 32 and the electrically-driven power steering apparatus 10 can be simplified.

Particularly, since the resolver stator 60 is connected to the stator 28 through the bobbins 78 which are positioned at the constant circumferential position of the stator 28 and are attachable to the stator 28 and the bus ring holder 80 which is positioned at the constant circumferential position with respect to the bobbins 78, the bobbins 78 and the bus ring holder 80 that are existent components of a conventional brushless motor can be used. Therefore, in comparison with a construction where the resolver stator 60 is attached to a separate member for connection to the stator 28, an increase in the number of parts can be prevented.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A positioning mechanism of a resolver, which is disposed at a housing member for receiving a brushless motor which has a rotor and a stator having a plurality of coils to rotate the rotor by alternately changing electrical conduction to the coils, a resolver stator received in the housing member and a resolver rotor which is coupled and fixed at a constant circumferential position with respect to the rotor to rotate together with the rotor and which detects a rotational position of the rotor with respect to the stator, a holding portion holding the resolver stator being formed in the stator, and a positioning member for positioning the resolver stator with respect to the stator being coupled and fixed to the stator to be positioned at a constant circumferential position with respect to the stator, and wherein the resolver stator is held by the holding portion so as to be positioned at the constant circumferential position with respect to the stator, the positioning member being constructed with bobbins which are positioned at constant circumferential positions with respect to the stator and a bus ring holder which is positioned at a constant circumferential position with respect to the bobbins, and wherein the holding portion is formed in the bus ring holder.

2. The positioning mechanism of a resolver according to claim 1, the holding portion is a groove portion formed in the bus ring holder, a supporting member which is engaged with the groove portion is coupled and fixed to the resolver stator, and wherein the resolver stator is positioned at the constant circumferential position with respect to the stator by engaging the supporting member with the groove portion.

3. The positioning mechanism of a resolver according to claim 2, a supporting frame having two arc-shaped frame portions as the supporting member is disposed to an outer circumference of the resolver stator, each of the arc-shaped frame portions is constructed with two straight portions which extend in a radial direction and an arc-shaped portion which connects at least one-side end of the straight portions, the groove portion being formed in a distal end of each of four arm portions which extend in an axial direction of the bus ring holder, and wherein each straight portion of the resolver stator is engaged with the groove portion.

4. An electrically-driven power steering apparatus having the positioning mechanism according to claim 3.

5. An electrically-driven power steering apparatus having the positioning mechanism according to claim 2.

6. An electrically-driven power steering apparatus having the positioning mechanism according to claim 1.

\* \* \* \* \*